United States Patent [19]

Binish

[11] Patent Number: 5,031,951

[45] Date of Patent: Jul. 16, 1991

[54] SUN VISOR

[75] Inventor: Patrick W. Binish, Holland, Mich.

[73] Assignee: Prince Corporation, Holland, Mich.

[21] Appl. No.: 584,707

[22] Filed: Sep. 19, 1990

Related U.S. Application Data

[63] Continuation-in-part of Ser. No. 439,451, Nov. 20, 1989, Pat. No. 5,007,532.

[51] Int. Cl.⁵ ................................................ B60J 3/00
[52] U.S. Cl. ..................................... 296/97.1; 16/225; 29/91.1
[58] Field of Search ................... 296/97.1, 97.2, 97.3, 296/97.6, 97.9, 97.11, 97.12, 97.13; 16/225; 29/91.1

[56] References Cited

U.S. PATENT DOCUMENTS

| 4,163,579 | 8/1979 | Mahler et al. | 296/97.1 |
| 4,458,938 | 7/1984 | Viertel et al. | 296/97 |
| 4,570,990 | 2/1986 | Flowerday | 296/97 |
| 4,626,019 | 12/1986 | Tung et al. | 296/97.1 |

FOREIGN PATENT DOCUMENTS 63-90428 4/1988 Japan .
2098941 12/1982 United Kingdom ............... 296/97.1

Primary Examiner—Robert R. Song
Attorney, Agent, or Firm—Price, Heneveld, Cooper, DeWitt & Litton

[57] ABSTRACT

A visor is disclosed of the type used in an automobile which has an attached ear portion. The visor has a self-supporting cardboard butterfly inner support which includes a pair of ear portions, one of which is attached to the major portion of the butterfly along a crease line formed between the major portion and the ear portion while the other ear portion is joined to the major portion of the butterfly by a slotted line having strips of material between slots. One side of the butterfly is covered with a decorative material. The butterfly is folded to form opposing edges and a urethane adhesive is used to bind the sides of the butterfly together. The adhesive contacts the edge of the decorative material contained within the folded butterfly and fixes it firmly in place. As the urethane resin cures, it expands to form a rigid foam member which forms a stiffening member for the visor. A torque member is attached to the visor within the folded butterfly and has a member for attachment to the headliner of an automobile. The ear portion of the visor is able to bend along the hinge line formed by the overlapped crease line and slotted line which separate the ear portion of the visor from the major portion.

30 Claims, 2 Drawing Sheets

SUN VISOR

CROSS-REFERENCE TO RELATED APPLICATION

The present invention is a continuation-in-part of application Ser. No. 07/439,451 filed Nov. 20, 1989, entitled VISOR AND METHOD FOR MAKING THE SAME, U.S. Pat. No. 5,007,532.

BACKGROUND OF THE INVENTION

The visors used in automobiles to protect the eyes of the driver and of the front seat passenger from direct sunlight or glare have undergone a substantial change over the years. What appears to be a simple device is actually a complex structure having a hardboard, fiberboard or molded plastic inner core which is covered with padding and then a decorative cover. A torque or visor pivot rod mechanism is also included for holding the visor in the stored position or to allow the visor to be set at the position which provides the preferred shade for the driver's or passenger's eyes, the use position.

In a typical visor, a molded plastic or hardboard frame is used to establish the overall configuration of the visor. In many cases, paper or thin cardboard, in what is called a butterfly configuration, is then folded over the plastic frame or hardboard. Foam padding is then glued to the paper butterfly and then the entire configuration is covered with a decorative material which is sewn in place about the edge of the visor. In some constructions, the foam padding has been placed underneath the paper butterfly with the decorative material being completely glued to the paper butterfly and wrapped around the padded core of the visor. The ear for the visor is formed using matching shaped portions of the thin paper or cardboard butterfly. A fold line is predetermined for each ear by forming overlapping perforated lines between each visor and ear section. The ear portions tended to break free in use leaving the ear limply supported by the decorative cover.

U.S. Pat. No. 4,570,990, issued Feb. 18, 1986, to Flowerday and assigned to the assignee of the present invention, is typical of the prior art visor construction. The patent discloses an automobile-type visor employing a molded plastic core. The edge of the upholstery material is fastened by adhesive about the edge of the molded plastic core and then the core is folded and fused to join the core halves together to additionally secure the edge portions of the decorative material by compressing the upholstery material around the periphery between the facing peripheral edges of the core halves.

When it was desired to have flexibility in the ear portions of the visor, a metal, wooden or fiberboard core was often used with a metal hinge connecting the ear portion and major portion of the core. The necessity to use a hinge member to provide flexibility to the ear portion of the visor added to the complexity and expense of the visor.

In all of the constructions of visors seen to date, a core member of some type has been used upon which the visor is assembled.

SUMMARY OF THE INVENTION

In accordance with the present invention, an improved substantially simplified visor has been developed in which a self-supporting preformed cardboard member is covered with a decorative material and then folded to provide abutting edges. The cardboard material is formed to raise the center portion of each butterfly wing relative to the surrounding edge. The ear portions of the butterfly are prepared by providing a crease line between one ear portion and the major portion of the butterfly to which the ear is attached. The other ear portion is joined to the major portion of the butterfly by strips of material which are preferably formed by punching or die cutting slots in the butterfly between the ear and the major portion of the butterfly to which the ear is attached. When the wings of the butterfly are closed together, the edges abut and the raised center portion provides thickness to the visor. Before the cardboard is folded, adhesive is applied near one edge of the interior of the cardboard member. The cardboard core is then folded, bringing one edge into contact with the other, and the edge of the covering material is folded into the space between the two abutting cardboard edges. The assembly is then held together to allow the adhesive to firmly grip both cardboard faces and the edge of the decorative material which projects into the cardboard core. The adhesive expands to form a rigid foam member which not only adheres the two cardboard surfaces together, but also adheres to and fills any crevice and opening in the edge of the decorative material to firmly hold it in place. No inner core support is used in this construction of the visor which substantially simplifies the construction of the visor and reduces the expense by eliminating the core support and all the parts associated with the core support. The ear portion of the visor can be flexed along the hinge formed by the overlapping crease line and slotted line formed between the major portions of the core and the attached ear portions. The ear portion of the visor will not break off under common usage because of the strength provided by the solid crease line. The same material is used to form both the major portion of the visor and the ear portion.

In preparing the butterfly portion of the visor, one ear portion is separated from the visor by a crease line while the other ear is separated by a slotted line. By positioning the slotted line on the side facing the passenger when the ear is down, the visor will easily bend when the visor is raised to the stored position and the ear is pushed back by the headliner. On the other hand, having the solid piece of butterfly including visor and ear, facing toward the windshield, the crease line has strength to support the ear in the use position against the windshield limiting any tendency for the ear to sag or fall back from the windshield.

In the improved visor of the present invention, the adhesive performs multiple functions. It expands to fill the portion of the cavity in the visor adjacent the abutting edges. It firmly attaches the two cardboard faces together, secures the decorative covering material in place and forms a rigid stiffening member for the edge of the visor. It also simplifies the construction of the visor and eliminates the need for a heavy inner core which was previously used to clamp the decorative material in place on the outer surface of the visor.

DETAILED DESCRIPTION OF THE PREFERRED EMBODIMENTS

Figure 1:
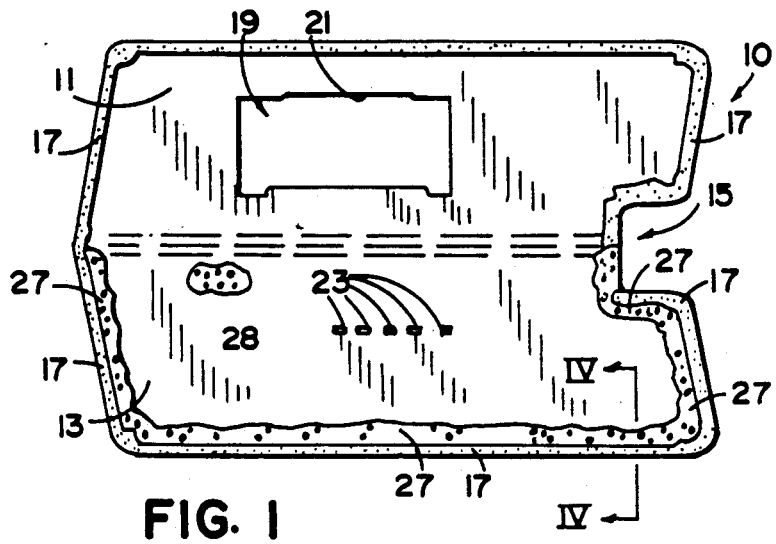
FIG. 1 is an elevational view of an open visor assembly showing the butterfly core, the decorative fabric and adhesive in place along one edge of the core.

Referring to FIG. 1, the visor assembly is indicated generally by the number 10. The visor has an inner core made of the walls 11 and 13 preferably formed in one butterfly-like piece of a thin self-supporting material. The walls or wings 11 and 13 can be prepared by a die cutting or stamping procedure, or by molding depending upon the material. The walls or wings 11 and 13 are intended to be folded, as shown by the directional arrow, about the crease lines indicated generally by the number 15. The crease lines provide a living hinge for the butterfly. Although within the narrowest aspect of this invention a paper derivative material is the preferred material from which the walls 11 and 13 are formed. Any compression formed composite natural or synthetic material can be used. The walls can be approximately 0.040 inch to 0.100 inch in thickness. The thin wall material is supported by the adhesive while thicker materials are unnecessary and thereby add expense.

The preferred wall material is a cardboard formed of laminate of kraft paper 0.080 inch in thickness and having a thin sheet of plastic film under each outer layer of paper to provide wet strength. The material is sold under the trademark VALDOR by Fiber Converters of Three Rivers, MI. Similar materials are also available from other suppliers. The most important requirement for the wall material is that it be capable of being formed, be self-supporting and be compatible with the adhesive used, that is, nonreactive and capable of being wet or adhered to by the adhesive. In addition to cardboard and composite materials, plastic materials meeting these physical requirements can also be used as suitable wall materials for the visor.

The outer surface of the visor 10 is covered with a decorative material 17 which completely covers the outer or exposed surface of the visor. The decorative material 17 can be cloth, leather, or preferably a vinyl or fabric outer sheet integrally bonded to a polymeric foam backing material. Within the broadest aspect of this invention it is conceivable that the outer surfaces of the walls 11 and 13 would have decorative surfaces or a flock coating applied thereto before or after being secured together, thus eliminating the need for a separate decorative material. Also, within the broadest aspect of this invention, a material formed into a sleeve can be slipped over the body formed by the two halves.

Figure 6:
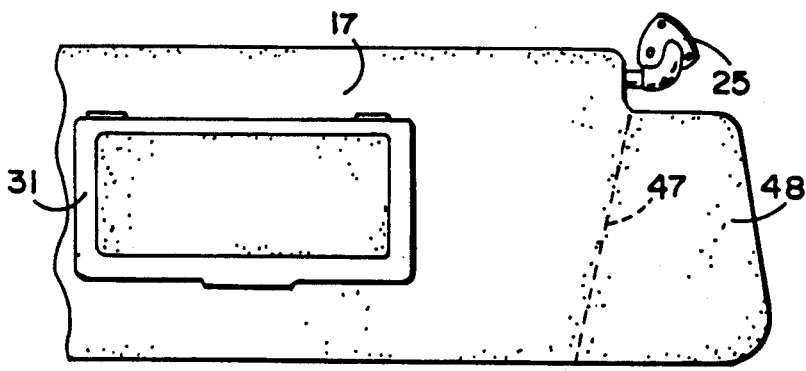
FIG. 6 shows the visor of FIG. 5 closed with a visor support assembly in place and with the flex line for the visor ear portion shown in phantom.

The butterfly-like wing 11 has an opening 19 which is bounded by the edges 21. The butterfly-like wing 13 has a row of perforations 23 which are used to support a spring and detent member (not shown) which is used to hold the visor 10 on a pivot rod assembly 25 (FIG. 6). A suitable visor pivot rod assembly is disclosed in U.S. patent application Ser. No. 413,235 filed Sept. 27, 1989, in the name of M. Lanser et. al., assigned to the assignee of the instant application and incorporated herein by reference.

As shown in FIG. 1, the decorative material 17 covers the free edges of the butterfly wings 11 and 13. The material 17 is held in place on the cardboard core during the visor assembly process. Before the core is folded closed, a layer of adhesive 27 is applied adjacent the edge of the butterfly wing 13 in contact with the edge of the fabric material 17 which is turned inward over the edge of the butterfly wing. The adhesive 27 contacts the cardboard core and the edge of the decorative material. Since the butterfly is substantially symmetrical, when wing 11 is folded over wing 13 the adhesive 27 will contact the inner surface of the butterfly-like wing 11 and the edge of the decorative material covering the edge of the butterfly wing 11. It is only necessary to apply the adhesive to one wing of the butterfly in view of the substantially symmetrical construction. Upon folding of the butterfly, the adhesive will be applied to the closed wing (FIG. 2) where it will contact the cardboard core and the edges of the decorative material 17, which covers that wing of the butterfly. A separate deposit of adhesive 28 is made near the hinge to prevent the wings of the butterfly from sliding relative to one another.

While many different adhesives can be used to seal the butterfly wings together to form the visor core, suitable adhesives are preferably applied as a viscous liquid and form a rigid member when cured or reacted, are compatible with the core and decorative cover material, able to withstand temperatures encountered by the interior of an automobile (220° F.). Moisture cured polyurethane resins and hot melt polyamid resins are suitable for use. The preferred adhesive is a rigid urethane foam similar to the type used for insulation purposes. The foam can be either a single urethane resin or, by way of example and not limitation, a two part mixture of a urethane resin and an isocyanate resin. Suitable urethane resins are available from Dow Chemical, Mobay, Tanner Chemical and BASF. The preferred material from BASF is a "TF" foam adhesive which is a mixture of a urethane and an isocyanate resin. The resin includes a hallogenated hydrocarbon blowing agent to cause the material to foam. A foam adhesive is preferred since the foam cuts down on the amount of adhesive material used, and the weight of the adhesive.

Adhesive 27 can be applied from a dispenser having a nozzle which will lay down a bead of the adhesive along the edge of the cardboard butterfly in contact with the edge of the decorative material. The butterfly is closed after application of the adhesive and the urethane resin reacts quickly to foam and form a rigid member which firmly seals the two wings of the butterfly together and firmly attaches and holds the decorative material in place. The decorative material is only loosely held by the edges of the visor core.

Figure 2:
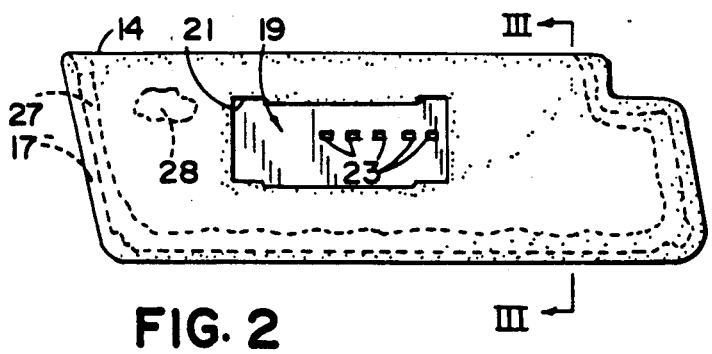
FIG. 2 is an elevational view of the visor of FIG. 1, now closed.
Figure 3:
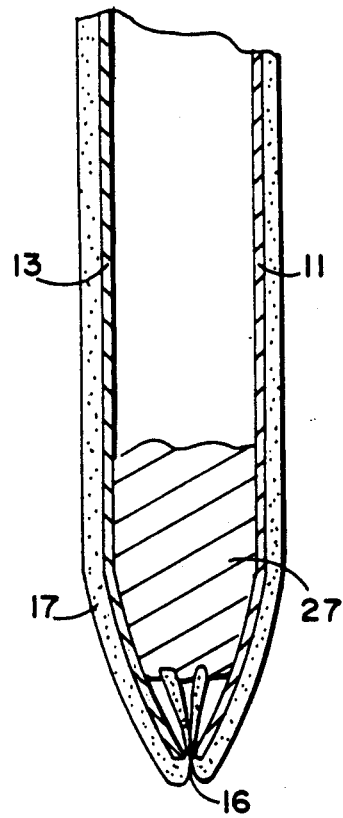
FIG. 3 is an enlarged partial sectional view taken along the line III—III of FIG. 2.
Figure 4:
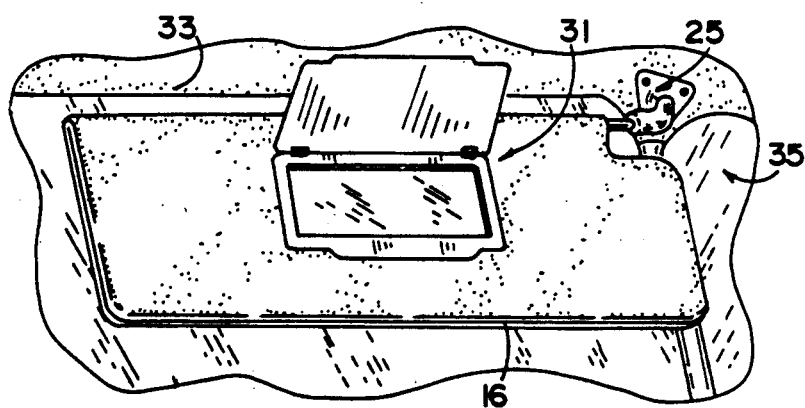
FIG. 4 is a perspective view showing the visor in place in an automobile and with a vanity mirror installed and open in the visor.

Now referring to FIG. 3, it can be seen that the adhesive 27 expands and becomes a rigid foam-like material. The expansion of the adhesive fills the portion of the cavity within the visor adjacent the abutting edges and any recess or cavities in the decorative cover material to securely adhere the cover to the core. The visor has a smooth leading edge 14 (FIG. 2) caused by the gradual bending of the cardboard butterfly core material about the series of crease lines 15. The crease lines 15 are a series of parallel relief cuts in the surface of the cardboard material which form a living hinge and facilitate the smooth bending of the cardboard core. At the opposite edge of the visor, the decorative material 17 is turned in between the edges of the wings 11 and 13 and forms a smooth trailing edge 16 on the visor with the decorative material being held tightly in place by the adhesive. No stitching is required to hold the decorative material in place. Also, the cardboard core is not intended to clamp the material in place as is the usual practice with polymeric cores, the construction here being much simpler than that with polymeric butterfly cores which rely on a high clamping pressure between the opposed edges of the folded butterfly polymeric material to hold the decorative material in place.

If desired, a vanity mirror 31 can be placed into the open area 19 in the face of the visor, as shown in FIG. 6. The vanity mirror can be glued to the back of the visor 13 with the same adhesive. The back of the mirror should have a safety coating thereon to prevent glass fragments from escaping in the event of an accident. A layer of tape can be used for the safety coating. In FIG. 6, the visor 10 is shown lowered covering a portion of the windshield 35.

The adhesive material 27 cures to become a rigid foam reinforcing member about the edge of the visor (FIG. 2). The cured adhesive gives the visor substantial tortional strength so that it can be manipulated by the driver or passenger in the vehicle without distortion or damage. In the past, the visor had to rely on an internal reinforcing member which added cost and complexity to the visor.

Figure 5:
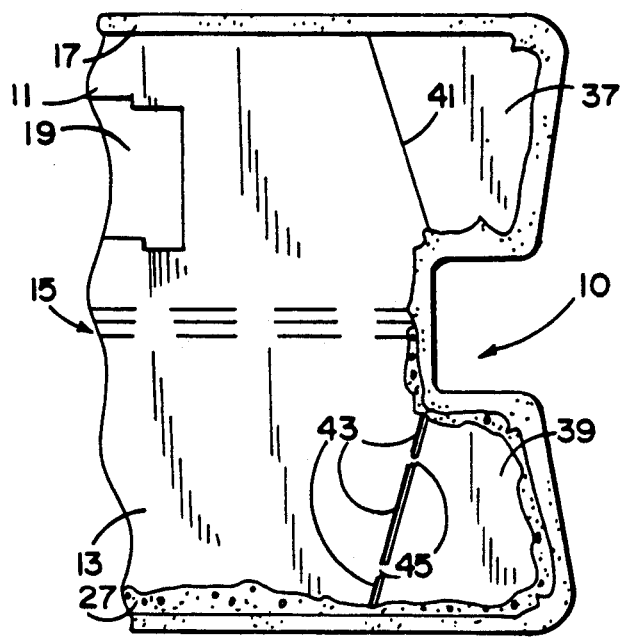
FIG. 5 is an enlarged elevational view of a portion of an open visor showing the ear portions.

Referring to FIG. 5, where like reference numerals are used to indicate like parts, the visor 10 is shown with ear portions 37 and 39. As discussed previously, the visor 10 is completed by folding portion 11 down onto lower portion 13, joining the two portions together by means of the adhesive 27 which need only be placed on one portion in view of the symmetrical configuration of the visor butterfly.

In order to provide flexibility in the ear portion of the finished visor, that is, the portion of the visor which bends when the visor is turned upward to its storage position against the headliner of the automobile, a crease line 41 is provided along the edge of ear portion 37. A plurality of in-line slots 43, separated by bridging strips 45 of core material, are used to separate the ear portion 39 from the butterfly portion 13 of the visor. The crease line 41 can be formed in the butterfly by a suitable stamping machine having a rounded blade for shaping the core material which is preferably cardboard. The slotted line separating ear 39 from the major portion of that wing of the butterfly 13 can be prepared by a die stamping process. The slots can be of many different widths with the preferred width being approximately 0.100 inch. The two processes can be combined in a single stroke of a press so that the crease line 41 and the slots 43 are added to the visor in a single operation. The slotted line is preferably formed on the side of the visor which faces the passenger. Having the slotted line on this side facilitates the storage of the visor. The ear portion of the visor can easily bend away from the corner of the roof or headliner when the visor is raised. The solid crease line tends to stiffen the ear portion supporting it against the windshield when the visor is in the use position.

Figure 7:
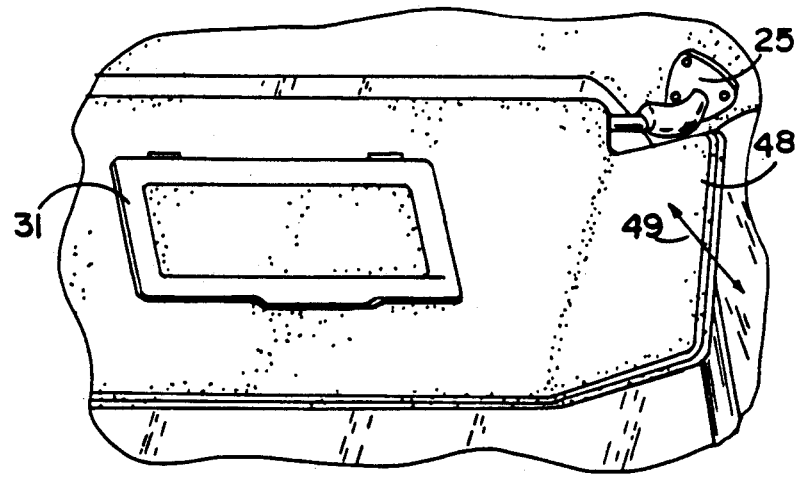
FIG. 7 is a partial perspective view showing the flexing of the ear portion of the visor.

The visor of FIG. 5 is then closed, as previously discussed, causing the adhesive material 27 to join the portions 11 and 13 of the visor and ears 37 and 39 together into a unitary assembly. As shown in FIG. 6, the fold line or hinge 47 is shown in phantom being covered by the decorative material 17. The hinge 47 is formed by the overlapping of the crease line 41 and the slotted line 43 with the connecting bridges 45. The slots 43 substantially weaken the line joining visor portion 13 and ear 39 and enable the visor to flex along the hinge line formed by the crease line 41. As shown in FIG. 7, the ear portion 48 can move upwardly or downwardly, as indicated by the directional arrow 49. The cured adhesive 27 tends to deform where it bridges the fold line to facilitate movement of the ear of the visor.

From the above description, it can be seen that a substantially improved automobile visor has been developed using a cardboard or cardboard-like material as a self-supporting, rigid core member. No additional internal structure is needed to support the visor other than the cardboard and the adhesive material which performs multiple functions. The adhesive adheres two wings of the butterfly core together, secures the decorative material in place, and provides a reinforcing member for the edges of the visor. The ear portion is enabled to flex using the overlapped crease line and slotted line in the core material to form a hinge.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

1. A core for use in the manufacture of automobile-type sun visors comprising:
   a self-supporting wall member which is substantially symmetrical on either side of a fold line, said wall member having two shaped major portions joined along said fold line for forming the major portion of said sun visor;
   a first ear portion attached along a crease line to an edge of one of said major portions of said visor;
   a second ear portion attached along a slotted line by at least one strip of material to the edge of the other major portion of said visor so that when said wall member is folded, said ear portions of said visor overlap and are enabled to flex along the line formed by the overlapped crease line and slotted line.

2. A core for use in the manufacture of automobile-type sun visors as described in claim 1, wherein said crease line is pressed into the wall member.

3. A core for use in the manufacture of automobile-type sun visors as described in claim 1, wherein said slotted line is formed by cutting said wall member.

4. A core for use in the manufacture of automobile-type sun visors as described in claim 1, wherein said slotted line is cut in the wing of said wall member which will face the driver and passenger of an automobile when in use.

5. A core for use in the manufacture of automobile-type sun visors as described in claim 1, wherein said cardboard core is made of laminated layers of kraft paper.

6. A core for use in the manufacture of automobile-type sun visors as described in claim 1, wherein said cardboard core is made of laminated layers of kraft paper and has a layer of plastic film for providing wet strength.

7. A core for use in the manufacture of automobile-type sun visors as described in claim 3, wherein the slots in said slotted line are approximately 0.1 inch wide.

8. An automobile-type visor comprising:
a self-supporting wall member which is substantially symmetrical on either side of a fold line;
said wall member having two portions connected along said fold line forming the major portion of said visor and two ear portions with one ear portion being joined to the same edge of each major portion, one of said ear portions being connected to the major portion along a crease line and the other ear portion being connected to the major portion along a slotted line with spaced strips of material separating the slots;
said wall member when folded on said fold line bringing said major portions and said ear portions of said wall member into registration forming a core for said visor with said crease line and slotted line overlapping;
a decorative material for covering the outside of said core and having an edge portion turned over the edges of said core into the interior of said core;
a layer of adhesive within and near said abutting edges of said core for holding said core closed and for to said decorative material; and
said ear portion of said visor being bendable along the hinge formed by the overlapping crease line and slotted line.

9. An automobile-type visor as set forth in claim 8, wherein said core is in a butterfly-like configuration which is folded about a center hinge portion.

10. An automobile-type visor as set forth in claim 8, wherein said decorative material has an edge portion which extends beyond the edge of the folded core and said edge portion is turned into said folded core to cover said abutting edges of said core.

11. An automobile-type visor as set forth in claim 8, wherein said layer of adhesive is in the form of an expanded bead with said bead being deformed in use where it crosses said crease line between said major portion of said visor and said ear portion.

12. An automobile-type visor as set forth in claim 8, wherein said adhesive contacts said edge portion of said decorative material and secures said decorative material in place on said core.

13. An automobile-type visor as set forth in claim 8, wherein said adhesive is a polyurethane resin which hardens to a rigid foam.

14. An automobile-type visor as set forth in claim 8, wherein said adhesive is a mixture of a urethane resin and an isocyanate resin which hardens to a rigid foam.

15. An automobile-type visor as set forth in claim 8, wherein a torque member is attached to said visor within said core and has a member for attaching said torque member to said automobile.

16. An automobile-type visor as set forth in claim 8, wherein said core is made of cardboard.

17. An automobile-type visor as set forth in claim 8, wherein said layer of adhesive fills a portion of the space adjacent said bordering edges of said folded wall member, firmly attaches the two sides of the wall member together, attaches the edge of said decorative cover material to the inside of the wall member, and forms a rigid stiffening member for the edge of said visor.

18. A visor as set forth in claim 8, wherein said core is preformed so that when folded the edges abut while the sides of the core away from said abutting edges are spaced apart.

19. A visor as set forth in claim 8, wherein said slotted line is in the position of said wall member which faces the interior of said automobile when said visor is in the use position.

20. A visor as set forth in claim 8, wherein said cardboard core is made of laminated layers of kraft paper.

21. A visor as set forth in claim 8, wherein said cardboard core is made of laminated layers of kraft paper and has a layer of plastic film for providing wet strength.

22. A method of making an automobile-type visor having a flexible ear portion comprising the following steps:
providing a substantially self-supporting wall member which is substantially symmetrical on either side of a fold line, said wall member having two portions connected along said fold line for forming the major portions of said visor and two ear portions with one ear portion being joined to the same edge of each major portion, one of said ear portions being connected to the major portion along a crease line and the other ear portion being connected to the major portion along a slotted line with spaced strips of material separating the slots;
providing a decorative cover for one side of said wall member and the edges thereof;
applying a bead of an adhesive material adjacent one edge of said wall member;
folding said wall member and said decorative cover member to form abutting edge portions with said edges of said decorative cover being folded over and covering the abutting edges of said wall member with said crease line and said slotted line overlapping; and
curing said adhesive to firmly join together the edges of said wall member and to firmly fasten the edge of said decorative cover between the walls of said wall member with said ear of said visor being flexible along the hinge line formed by the overlapping crease line and slotted line.

23. A method for making an automobile-type visor as set forth in claim 22, including the additional step of fastening a torque member to said wall member before said wall member is folded.

24. A method for making an automobile-type visor as set forth in claim 22, wherein said adhesive expands on curing to fill a portion of the space between said walls adjacent said abutting edges of said folded wall member, firmly attaches the two edges of the wall member together, attaches the edge of said decorative cover material between the walls of the wall member, and forms a rigid stiffening member for the edge of said visor.

25. A method for making an automobile-type visor as set forth in claim 22, including the step of preforming said wall member so that when folded the edges of said preformed wall member will abut while the side portions of said wall member will be spaced from each other.

26. A method of making an automobile-type visor comprising the following steps:
providing a self-supporting wall member which is substantially symmetrical on either side of a fold line, said wall member having two portions connected along said fold line for forming the major portion of said visor and two ear portions with each ear portion being joined to the same edge of each major portion;

forming a crease line between one of said ear portions and said major portion;

perforating a line between said other ear portion and said other major portion to form a slotted line with spaced strips separating said slots and connecting said ear portion to said major portion;

providing a decorative cover for one side of said wall member and the edges thereof;

applying a bead of an adhesive material adjacent one edge of said wall member;

folding said wall member and said decorative cover member to form abutting edge portions with said edges of said decorative cover being folded over and covering the abutting edges of said wall member and with said slotted line overlapping said crease line; and curing said adhesive to firmly join together the edges of said wall member and to firmly fasten the edge of said decorative cover between the walls of said wall member, said joined ear portion of said wall member being able to bend along a hinge line formed by the overlapping of said crease line and said slotted line between said ear portion and said major portion of said visor.

27. A method of making an automobile-type visor as set forth in claim 26, wherein said crease line is formed by stamping said wall member.

28. A method of making an automobile-type visor as set forth in claim 26, wherein said slotted line is formed by die cutting said wall member.

29. A method of making an automobile-type visor as set forth in claim 26, wherein said crease line and said slotted line are formed in a single operation.

30. A method of making an automobile-type visor as set forth in claim 26, wherein said slotted line is formed on the side of the visor which will face the driver or passenger of the automobile when in use.

* * * * *

UNITED STATES PATENT AND TRADEMARK OFFICE
CERTIFICATE OF CORRECTION

PATENT NO. : 5,031,951

DATED : July 16, 1991

INVENTOR(S) : Patrick W. Binish

It is certified that error appears in the above-identified patent and that said Letters Patent is hereby corrected as shown below:

Column 7, Line 29:
      After "for" insert --adhering--.

Signed and Sealed this

Twenty-second Day of December, 1992

Attest:

DOUGLAS B. COMER

*Attesting Officer*      *Acting Commissioner of Patents and Trademarks*